US008230481B2

(12) United States Patent
Singh et al.

(10) Patent No.: US 8,230,481 B2
(45) Date of Patent: Jul. 24, 2012

(54) METHODS, SYSTEMS, AND COMPUTER PROGRAM PRODUCTS FOR RECONFIGURING AN OPERATIONAL MODE OF AN INPUT INTERFACE BASED ON A PRIVACY LEVEL

(75) Inventors: Mona Singh, Cary, NC (US); Jeffrey Scott Bardsley, Durham, NC (US)

(73) Assignee: Armstrong Quinton Co. LLC, Wilmington, DE (US)

( * ) Notice: Subject to any disclaimer, the term of this patent is extended or adjusted under 35 U.S.C. 154(b) by 1151 days.

(21) Appl. No.: 11/286,718

(22) Filed: Nov. 23, 2005

(65) Prior Publication Data

US 2007/0118876 A1 May 24, 2007

(51) Int. Cl.
G06F 7/04 (2006.01)
G06F 17/30 (2006.01)
(52) U.S. Cl. .......................................... 726/2
(58) Field of Classification Search ....................... 726/2
See application file for complete search history.

(56) References Cited

U.S. PATENT DOCUMENTS

| | | | |
|---|---|---|---|
| 4,431,988 A | | 2/1984 | Molusis et al. |
| 4,688,020 A * | | 8/1987 | Kuehneman et al. ............ 341/22 |
| 4,906,117 A | | 3/1990 | Birdwell |
| 5,086,503 A | | 2/1992 | Chung et al. |
| 5,552,782 A | | 9/1996 | Horn |
| 5,748,177 A | | 5/1998 | Baker et al. |
| 5,920,303 A | | 7/1999 | Baker et al. |
| 6,058,469 A * | | 5/2000 | Baxter ............................ 712/43 |
| 6,199,125 B1 | | 3/2001 | Cortesi |
| 6,359,572 B1 | | 3/2002 | Vale |
| 6,405,245 B1 * | | 6/2002 | Burson et al. .................. 709/217 |
| 6,891,528 B2 | | 5/2005 | Houston |
| 2003/0201971 A1 | | 10/2003 | Iesaka |
| 2003/0201982 A1 | | 10/2003 | Iesaka |
| 2004/0066374 A1 | | 4/2004 | Holloway et al. |
| 2004/0075647 A1 | | 4/2004 | Bean |
| 2004/0150535 A1 | | 8/2004 | Sun |
| 2004/0155868 A1 | | 8/2004 | Hui |
| 2004/0239637 A1 | | 12/2004 | Williams et al. |
| 2004/0263480 A1 | | 12/2004 | Pagan |
| 2005/0146447 A1 | | 7/2005 | Na |
| 2005/0182767 A1 * | | 8/2005 | Shoemaker et al. ............ 707/10 |

OTHER PUBLICATIONS

"Who Are You?," http://www.securityinfowatch.com/article/printer.jsp?id=6275, pp. 1-2 (Nov. 7, 2005).
Machrone, "Defense Against Keystroke Loggers," http://www.extremetech.com/article2/0,3973,472055,00.asp, pp. 1-6 (Aug. 15, 2002).
"Keyboard Shortcuts—Across The Board Shortcuts," http://users.chariot.net.au/~kday/keyboardtips.html, pp. 1-10 (Jun. 16, 2000).

* cited by examiner

*Primary Examiner* — Kambiz Zand
*Assistant Examiner* — Stephen Sanders
(74) *Attorney, Agent, or Firm* — Connolly Bove Lodge & Hutz LLP

(57) ABSTRACT

Methods, systems, and computer program products for reconfiguring an operational mode of an input interface based on a privacy level are disclosed. According to one method, at least one of an environment in which data is being entered into a computer via an input interface and a destination for the data being entered is identified. An input interface privacy level is determined based on the identified at least one of the environment and the data destination. The input interface is reconfigured to operate in a mode corresponding to the determined input interface privacy level.

34 Claims, 6 Drawing Sheets

ND COMPUTER
METHODS, SYSTEMS, AND COMPUTER PROGRAM PRODUCTS FOR RECONFIGURING AN OPERATIONAL MODE OF AN INPUT INTERFACE BASED ON A PRIVACY LEVEL

TECHNICAL FIELD

The subject matter described herein relates to methods, systems, and computer program products for reconfiguring an operational mode of an input interface. More particularly, the subject matter described herein relates to methods, systems, and computer program products for reconfiguring an operational mode of an input interface based on a privacy level.

BACKGROUND

Computers and other electronic devices typically include an input interface with which an operator may enter data. A keyboard is an example of an input interface for receiving data from an operator. Further, computers and other electronic devices typically include an output interface, such as a display, for presenting data to an operator. The output interface may allow an operator to perceive data that is entered via an input interface and the result of the data that is entered via the input interface.

It is often desirable to protect the privacy of data that is entered via an input interface or the privacy of data presented via an output interface. For example, in a public setting, an operator may desire to protect the privacy of a social security number entered into a computer via a keyboard. A nearby person may be able to obtain the digits of the social security number by watching the keys as they are depressed by the operator. Alternatively, the nearby person may be able to obtain the entered social security number by seeing the numbers as they are displayed on the computer's display.

The data entered into an input interface may also be obtained by a tool known as a keystroke logger. A keystroke logger is a program that runs in the background of a computer for recording all the keystrokes entered by an operator. The keystroke data may be logged and transmitted to an attacker at another computer. The attacker may then review the keystrokes in order to find passwords or obtain information that could be used to compromise an application or computer in which the data is entered.

Some techniques have been developed for protecting the data entered via an input interface. For example, one device encrypts keystrokes entered by the operator and communicates the encrypted keystrokes to a driver that decrypts the keystrokes so that they may be understood by an application. However, even with this device, entered data may not be entirely secure because a nearby person may still be able to obtain the entered data by watching as the operator enters the data.

Another technique for protecting data includes remapping the keys of a keyboard. In this case, the actual data entered by depressing the keys of a keyboard is different than the labeling of the keys of the keyboard. For example, a key labeled "A" may actually enter in data for the letter "B". A nearby person would not be able to determine the actual data entered by watching the keys depressed by the operator unless he or she had knowledge of how the keyboard is remapped. However, a keystroke logger may be able to obtain the entered data by recording the keystrokes entered by the operator. In addition, this approach is limited since it does not take into account a privacy level associated with the data entry.

In view of the shortcomings of existing techniques for protecting the privacy of entered data, there exists a need for improved methods, systems, and computer program products for reconfiguring an input interface to protect the privacy of data.

SUMMARY

According to one aspect, the subject matter described herein includes a method for reconfiguring an operational mode of an input interface based on a privacy level. The method includes determining at least one of an environment in which data is being entered into a computer via an input interface and a destination for the data being entered. An input privacy level is determined based on the identified at least one of the environment and the data destination. Further, the input interface is reconfigured to operate in a mode corresponding to the determined input interface privacy level.

The subject matter described herein can be implemented as a computer program product comprising computer executable instructions embodied in a computer readable medium. Exemplary computer readable media suitable for implementing the subject matter described herein include disk memory devices, chip memory devices, application specific integrated circuits, and programmable logic devices. In addition, a computer program product that implements the subject matter described herein may be located on a single device or computing platform. Alternatively, the subject matter described herein can be implemented on a computer program product that is distributed across multiple devices or computing platforms.

BRIEF DESCRIPTION OF THE DRAWINGS

Exemplary embodiments of the subject matter will now be explained with reference to the accompanying drawings, of which.

DETAILED DESCRIPTION

Figure 1:
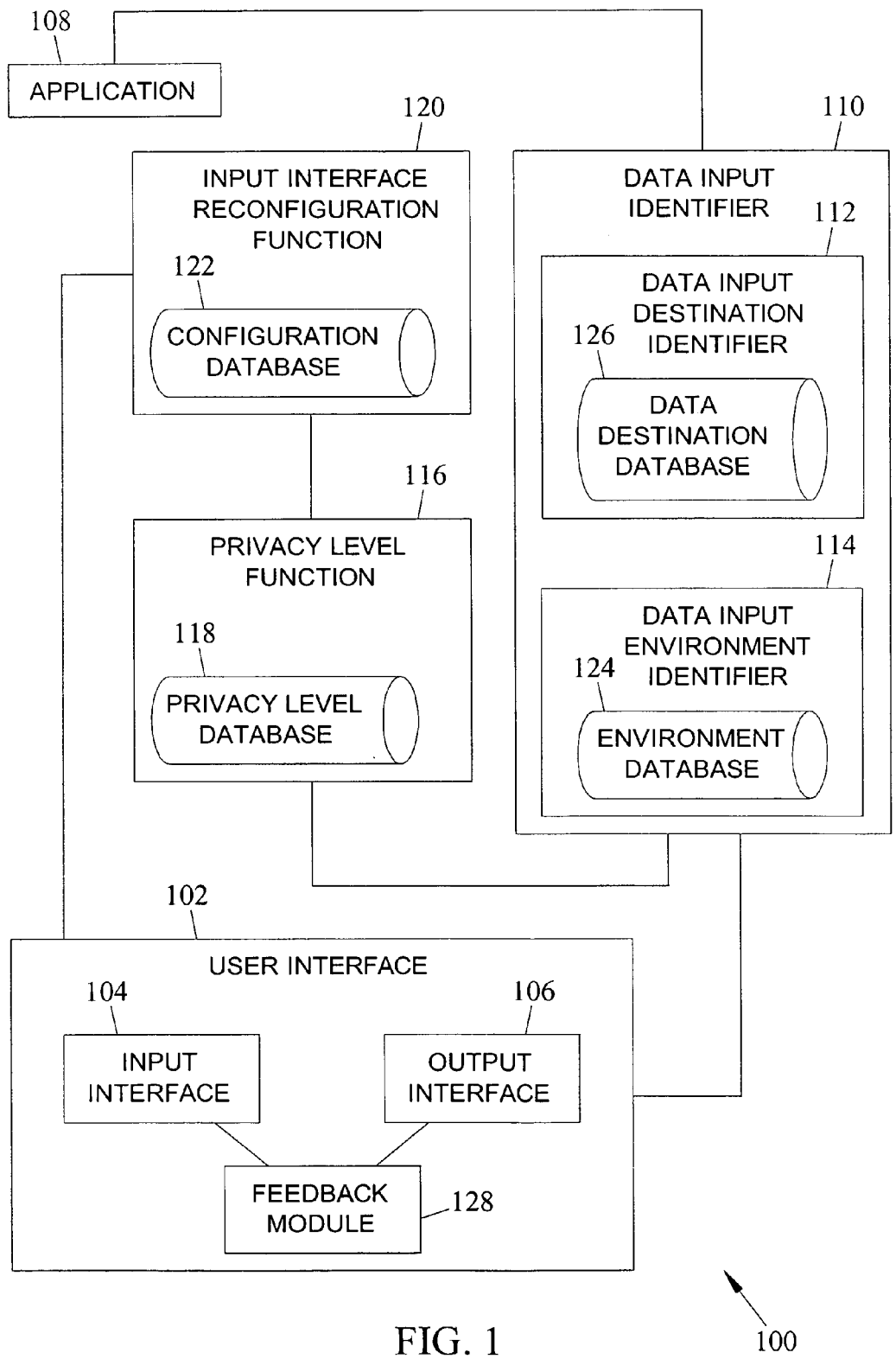
FIG. 1 is a block diagram illustrating an exemplary computer system for reconfiguring an operational mode of an input interface based on a privacy level according to an embodiment of the subject matter described herein.

According to one aspect, a system for reconfiguring an operational mode of an input interface based on a privacy level may be implemented as hardware, software, and/or firmware components executing on one or more components of a system having an input interface. FIG. 1 illustrates an example of a computer system 100 for reconfiguring an operational mode of an input interface based on a privacy level according to an embodiment of the subject matter described herein. Computer system 100 may be any suitable system for receiving input from an operator via an input interface, such as a personal computer, mobile phone, personal digital assistant, and the like. Referring to FIG. 1, computer system 100 may include a user interface 102 having an input interface 104. Input interface 104 is operable to receive input data from an operator. Input interface 104 may be any suitable device by which a user inputs data. For example, input interface 104 may be a keyboard, a keypad, or a touch screen display. User interface 102 may also include an output interface 106 for outputting data to the operator. Output interface 106 may include a display, a printer, a speaker, or any other suitable device with which an operator may perceive data.

System 100 may also include an application 108 with which an operator may interact by using user interface 102. Application 108 may be implemented as hardware, software, and/or firmware components executing on a computer. Further, application 108 may include functionality for receiving data input via input interface 104, implementing instructions included in the data, and providing resulting output data to the operator. In one exemplary implementation, application 108 may be a web browser installed on a computer local to the user or operator for providing access to the Internet. In an alternate implementation, application 108 may be located on a computer remotely located from a computer that includes user interface 102. For example, application 108 may be stored on a computer that is linked to user interface 102 via a network.

An operational mode of input interface 104 may be reconfigured based on an input interface privacy level. The input interface privacy level may be determined based on at least one of an environment in which data is being entered into system 100 via input interface 104 and a data input destination. Environmental factors that may be used in determining the input interface privacy level may include the location where data is being entered, persons present at the location of where data is being entered, the device to which input interface 104 provides the entered data, and/or a type of the input interface into which data is being entered (e.g., stylus or keyboard). For example, a higher privacy level may be set if data is being entered via a laptop keyboard located in a public Wi-Fi access point versus data being entered via the laptop keyboard in the user's home. The location at which data is being entered may be manually input by the user or may be automatically determined, for example, based on the network address assigned to the data entry terminal or based on the network address assigned to an access gateway through which access to a network is obtained. A global positioning sensor or cell phone base station(s) identifier may also be used to determine the location where data is being entered.

The data input destination may be determined based on data fields displayed to an operator for completion and/or an application with which the data is to be communicated. Examples of data fields include account login fields, operating system login fields, and document form fields. The privacy level may be determined to be higher for sensitive data fields, such as login ID and password fields, than for less sensitive data fields, such as Internet search queries. Similarly, the privacy level may be determined to be higher when the input data destination is an application that normally receives sensitive data input, such as a finance management application. In addition, the privacy level may be determined based on other factors, such as a uniform resource locator (URL) address in a Web browser, or a specific resource opened in an application.

As described above, the privacy level may be determined based on the environment and/or the data destination, and the input interface may be reconfigured based on the privacy level. A reconfiguration of the operational mode of input interface 104 may require the operator to enter data into input interface in a different manner in order to increase the security of data being entered. Conversely, the operational mode of input interface 104 may be reconfigured for reduced security when a reduced level of security is sufficient.

System 100 includes means for identifying at least one of an environment in which data is being entered into a computer via input interface 104 and a destination for the data being entered. For example, a data input identifier 110 of system 100 may include a data input destination identifier 112 for identifying a destination of data being entered by an operator. In an embodiment, a tag for a field may be read by data input destination identifier 112 for identifying the data destination. Further, for example, data input identifier 110 may include a data input environment identifier 114 for identifying an environment in which data is being entered by an operator.

Based on the identified environment and/or data destination, an input interface privacy level may be determined. System 100 includes means for determining an input interface privacy level based on at least one of the identified environment and data destination. For example, system 100 may include a privacy level function 116 for determining an input interface privacy level based on the identified environment and/or data destination. Data input identifier 110 may communicate an identified environment and/or data destination to function 116. In response to receiving the identified environment and/or data destination, function 116 may search a privacy level database 118 for an entry matching the identified environment and/or data destination. The matching entry may include an input interface privacy level corresponding to an operating mode of input interface 104.

System 100 includes means for reconfiguring input interface 104 to operate in a mode corresponding to a determined input interface privacy level. For example, system 100 may include an input interface reconfiguration function 120 for reconfiguring input interface 104 to operate in a mode corresponding to the input interface privacy level determined by function 116. Function 116 may communicate the determined privacy level to function 120. Based on the determined privacy level, function 120 may search a configuration database 122 for an entry matching the privacy level. The matching entry may include information for reconfiguring the operational mode of input interface 104. Based on the information in the matching entry, function 120 may reconfigure input interface 104 to another operational mode.

For example, function 120 can include a text input widget. Text input widgets are well-known to graphical user interface (GUI) programmers and designers. Hidden text input widgets used for hiding entry of sensitive data are also well-known. One implementation of function 120 may take the form of a mapped text input widget or a mapped hidden text input widget. Typically, these widgets will be simple extensions of the text input widget or hidden text input widget supplied by a GUI library in an associated operating system. Both of the mapped input widgets use reconfiguration rules so that when a mapped text character is received by the mapped input widget, it is mapped to the text character it has been configured to represent.

Figure 2:
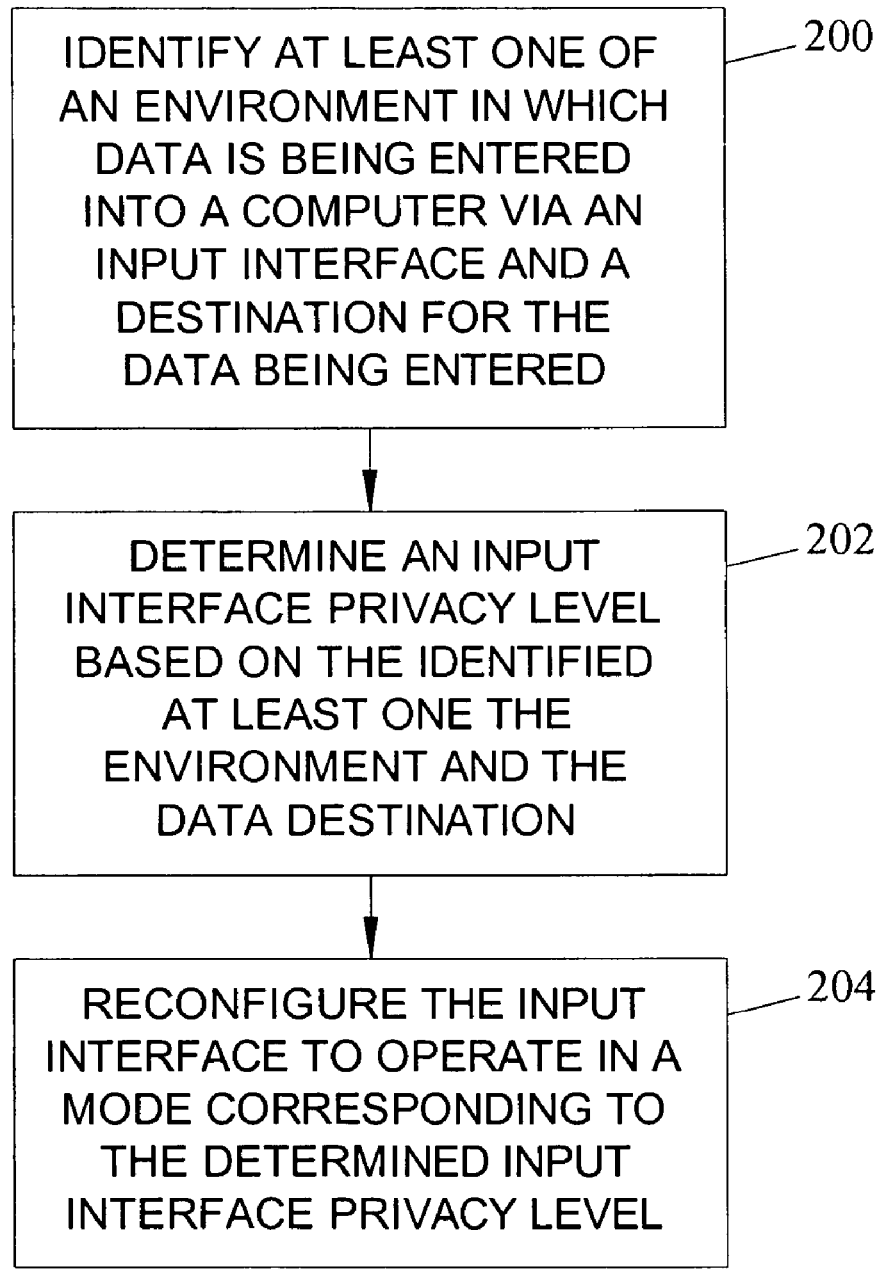
FIG. 2 is a flow chart of an exemplary process for reconfiguring an operational mode of an input interface based on a privacy level according to an embodiment of the subject matter described herein.

FIG. 2 is a flow chart illustrating an exemplary process for reconfiguring an operational mode of an input interface based on a privacy level according to an embodiment of the subject matter described herein. Referring to FIG. 2, block 200 includes identifying at least one of an environment in which data is being entered into a computer via an input interface and a destination for the data being entered. In block 202, an input interface privacy level is determined based on the identified one of the environment and the data destination. The input interface is reconfigured to operate in a mode corresponding to the determined input interface privacy level (step 204). Thus, in this exemplary process, a privacy level is used to reconfigure an operational mode of an input interface.

Figure 3:
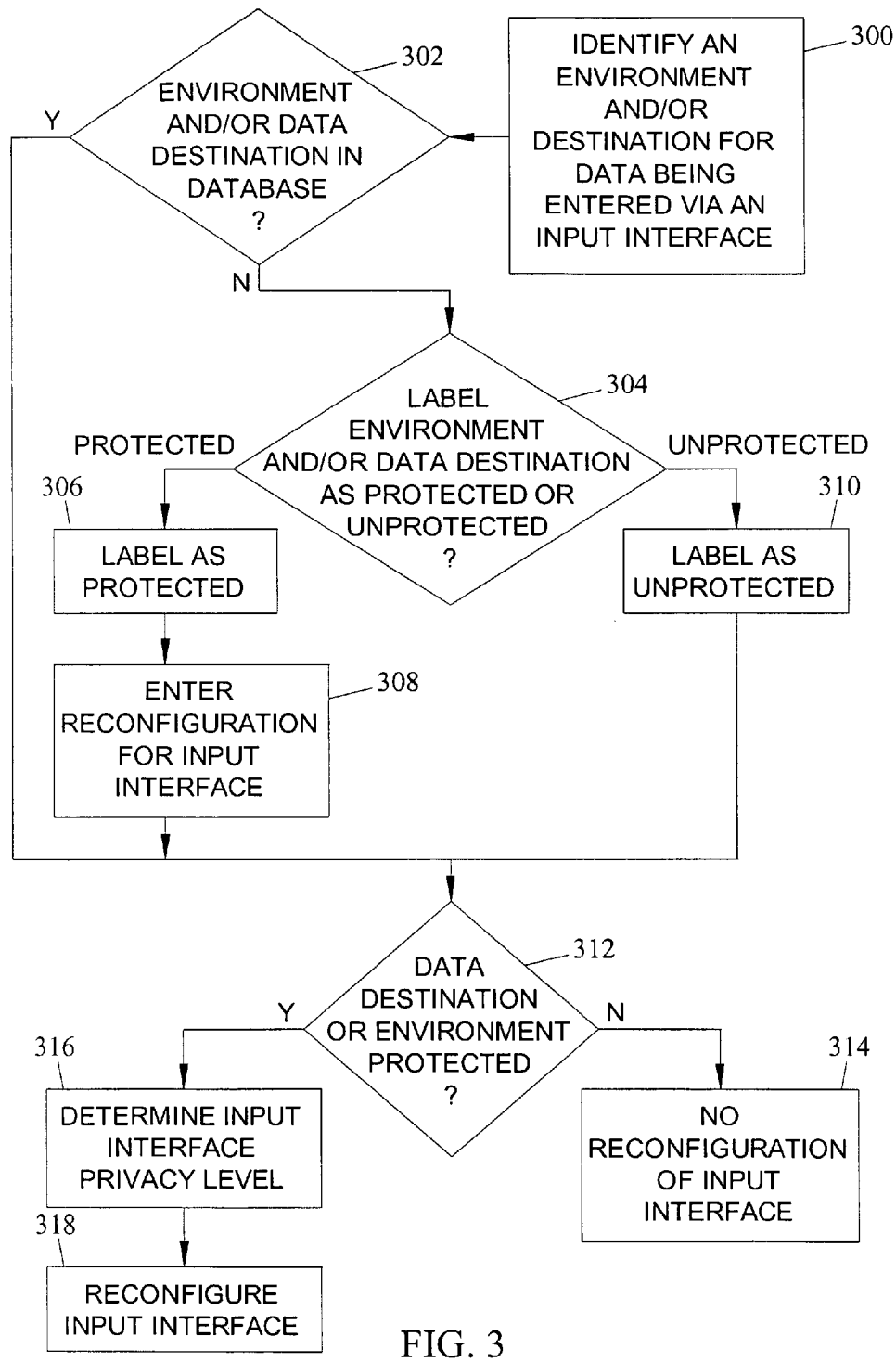
FIG. 3 is a flow chart of an exemplary process for reconfiguring an operational mode of an input interface shown in FIG. 1 based on a privacy level according to an embodiment of the subject matter described herein.

FIG. 3 is a flow chart illustrating another exemplary process for reconfiguring an operational mode of input interface 104 shown in FIG. 1 based on a privacy level according to an embodiment of the subject matter described herein. Referring to FIG. 3, block 300 includes identifying an environment in which data is being entered into input interface 104 and/or a destination of data being entered. The environment in which data is being entered may be identified by data input environment identifier 114. Data input destination identifier 112 may identify a destination for the data being entered into input interface 104.

In one embodiment, the environment may be the geographic location of where data is input into input interface 104, the device into which data is being input, or the proximity of other persons to the location at which data is being entered. Examples of geographic locations include an operator's residence, an operator's workplace, an airport, and a restaurant. The geographic location may be detected or entered by the operator. In one embodiment, identifier 114 may determine the geographic location by determining a network on which system 100 is communicating. Further, the geographic location may be determined based on an IP address, a server with which the device is connected, a host name of the device, or a media access control (MAC) address. Examples of the type of device into which data is being input include a mobile telephone, a PDA, a notebook computer, a work PC, and a home PC. Examples of persons of close proximity include co-workers, strangers, and family.

In one embodiment, the destination for the data being entered may be a particular data field and/or application. Examples of data fields include a password data field, a login data field, a social security number data field, and a credit card number data field. Examples of applications for which sensitive data destinations may be identified include online banking applications and secure sockets layer (SSL) connection applications.

In block 302, identifier 114 may determine whether a database includes the identified environment and/or data destination. Database 124 may include entries that identify environments in which data is entered. The entries may also identify the environments as being protected or unprotected. A protected environment may be an environment in which reconfiguration of input interface 104 is desired. Conversely, an unprotected environment may be an environment in which reconfiguration of input interface 104 is not desired. Alternatively, rather than simply defining protected and unprotected environments, the degree of user interface reconfiguration may be set proportionally to the identified privacy level. Identifier 114 may search an environment database 124 for an entry that matches the identified environment.

Similarly, a data destination database 126 may include entries that identify protected and unprotected data destinations. A protected data destination may be a data destination in which reconfiguration of input interface 104 is desired. Conversely, an unprotected environment may be a data destination in which reconfiguration of input interface 104 is not desired. Identifier 112 may search database 126 for an entry that matches the identified data destination.

If the environment and/or data destination is not in a database, the operator may be queried whether or not the environment and/or data destination should be labeled protected or unprotected (block 304). The operator may be queried via output interface 106. The operator may use input interface 104 for responding to the query to label the environment and/or data destination as protected or unprotected. If the operator labels an environment as protected, an entry may be generated and added to database 124 for labeling the environment as protected (block 306). Further, in block 306, if the operator labels a data destination as protected, an entry may be generated in database 126 for labeling the data destination as protected.

In block 308, the operator is prompted to enter reconfiguration information for input interface 104 that corresponds to the identified environment and/or data destination. The entered reconfiguration information may include an input interface privacy level. Further, the entered reconfiguration information may include information for reconfiguring input interface 104 when the input interface privacy level has been determined. An entry may be generated and stored in privacy level database 118 that identifies environment and/or data destination and the corresponding input interface privacy level entered by the operator. Further, the reconfiguration information entered by the operator may include information for reconfiguring input interface 104 when the input interface privacy level is determined. An entry may be generated and stored in configuration database 122 including the entered input interface privacy level and the entered reconfiguration information entered by the operator.

If the operator labels the identified environment as unprotected, an entry may be generated and stored in database 124 to label the environment as unprotected (block 310). Further, in block 310, if the operator labels a data destination as unprotected, an entry may be generated and stored in database 126 to label the data destination as unprotected. By labeling an environment and/or data destination as unprotected, the operator will not be prompted the next time that data is entered in the identified environment and/or data of the identified data destination is entered. Further, if the identified environment and/or data destination is unprotected, input interface 104 will not be reconfigured when the environment and/or data destination is determined.

If it is determined in block 302 that the environment and/or data destination is in the respective database 124, 126, the process proceeds to block 312. Referring to block 312, it is determined whether at least one of the data destination and the environment that the data is entered in at input interface 104 is protected. Identifier 112 may search environment database 126 to determine whether the data destination is protected. Identifier 114 may search data destination database 124 to determine whether the environment is protected. If the data destination and the environment is not protected, input interface 104 is not reconfigured and the operator may enter data into input interface 104 (block 314). In one embodiment, identifier 112 may include watchdog functionality for actively monitoring for the presence of protected fields being entered by the device operator.

In block 312, if it is determined that at least one of the data destination and the environment is protected, privacy level function 116 determines an input interface privacy level for input interface 104 based on the identified environment and/or data destination (block 316). An input interface privacy level may be selected from a plurality of different input interface privacy levels. Privacy level function 116 may search privacy level database 118 for an entry matching the identified environment and/or data destination in which data is being entered into input interface 104. The matching entry includes an input interface privacy level corresponding to an operating mode of input interface 104. Input interface 104 may be reconfigured based on the input interface privacy level (block 318). Input interface reconfiguration function 120 may reconfigure the input interface to an operating mode corresponding to the determined input interface privacy level.

It should be understood that, although privacy level database 118, configuration database 122, environment database 124, and data destination database 126 are shown as separate logical entities, these databases may be combined in any combination. Table 1 below shows exemplary entries that may be stored in a privacy level database. An entry may include an environment and/or data destination and a corresponding input interface privacy level. In the table, "-NA-" indicates that the environment or data destination for the entry is not applicable for this particular example.

TABLE 1

Exemplary Entries in a Privacy Level Database

| Environment and/or Data Destination | | Input Interface |
|---|---|---|
| Environment | Data Destination | Privacy Level |
| home | -NA- | Low |
| work PC | -NA- | High |
| Home PC | -NA- | Low |
| PDA | password | High |
| -NA- | social security no. field | High |
| -NA- | credit card no. field | High |
| work | SSL connection | Low |
| airport | -NA- | High |
| co-workers | -NA- | Low |
| family | -NA- | Low |
| -NA- | online banking URL | High |
| -NA- | finance management application | High |
| -NA- | file known to be sensitive | High |

According to one embodiment, a privacy level of high indicates that the input interface should be reconfigured because the security risk is high. Conversely, a privacy level of low indicates that the input interface should not be reconfigured because the security risk is low.

In addition, as described above, a level of reconfiguration of the input interface may be selected to be proportional to the privacy level without departing from the scope of the subject matter described herein. For example, the input interface privacy level may include more than two levels. In one exemplary implementation, the privacy level may range from 1-10, wherein 1 is the lowest and 10 is the highest. If the privacy level is 1, the input interface may not be reconfigured because the security risk is very low. If the privacy level is 2, a low level of input interface reconfiguration may be selected. For example, keys may be shifted one key to the right. If the privacy level is 3, the reconfiguration of the input interface may be randomly selected for each key or input location. In yet another example, user input interface reconfiguration may be changed at predetermined or random intervals depending on the privacy level. For example, a static reconfiguration may used for privacy level 2, a reconfiguration that changes every 10 minutes may be used for privacy level 3, and a reconfiguration that changes every minute may be used for privacy level 4.

In another embodiment, an input interface privacy level may be calculated based on values assigned to an identified environment and/or data destination. The environment and/or data destination values may be weighted. An identified environment and/or data destination with a higher weight will result in a higher input interface privacy level for providing increased security to the data entered into the input interface.

Table 2 below shows exemplary entries that may be stored in a configuration database. An entry may include an input interface privacy level and a corresponding configuration instruction for an input interface. The "Results" column indicates the resulting change in the configuration of the input interface when the input interface is reconfigured.

TABLE 2

Exemplary Entries in a Configuration Database

| Input Interface Privacy Level | Configuration Instruction for Input Interface | Results |
|---|---|---|
| High | Language Change | Data input at the keyboard is reconfigured as if the keyboard language configuration is changed. Characters may also be displayed in another language |
| Low | Shift Keys | Keys are shifted to the left |

The reconfiguration information may include instructions on how and when reconfiguration is activated for protected data destinations. Different data destinations may have different reconfiguration instructions applied to them. For example, for inputting data into a social security number field, the reconfiguration instructions may require that the operator add 2 to each digit entered for the social security number. Further, for example, for inputting data in a password field, the reconfiguration instructions may require that the characters on a keyboard be shifted up and down by rows or shift right or left.

Further, the reconfiguration information may include instructions on how and when reconfiguration is activated for protected environments. Different data environments may have different reconfiguration instructions applied to them. For example, passwords for a desktop application and a banking application may have different reconfiguration instructions applied to them due to different privacy level requirements. Further, reconfiguration may only be applied when at a specific location, such as a public location. Reconfiguration may also be applied when other users are in the vicinity. Other users may be detected by detecting the use of the BLUETOOTH® wireless connectivity technology or other short-range technologies by nearby devices.

Input interface 104 may be reconfigured such that the data entered into the interface is more secure when a determined privacy level is high. For example, with regard to a keyboard or a keypad, the orientation, character set, and display properties of the keys or buttons of the keyboard or keypad may be reconfigured. In one embodiment, reconfiguration includes changing the language input when one or more keys are depressed. In another embodiment, reconfiguration may include character or symbol replacement. An end user or application receiving the input data may identify the replacement. In yet another embodiment, an operator may define the reconfiguration of one or more keys. In another embodiment, reconfiguration may include not displaying characters on a display when data is input. In yet another embodiment, the keys displayed on input interface 104 may change when a determined privacy level is high. For example, the keys displayed on the keypad of a PDA may change such that the data actually entered when a key is depressed is different than the symbol for the key.

Figure 4A:
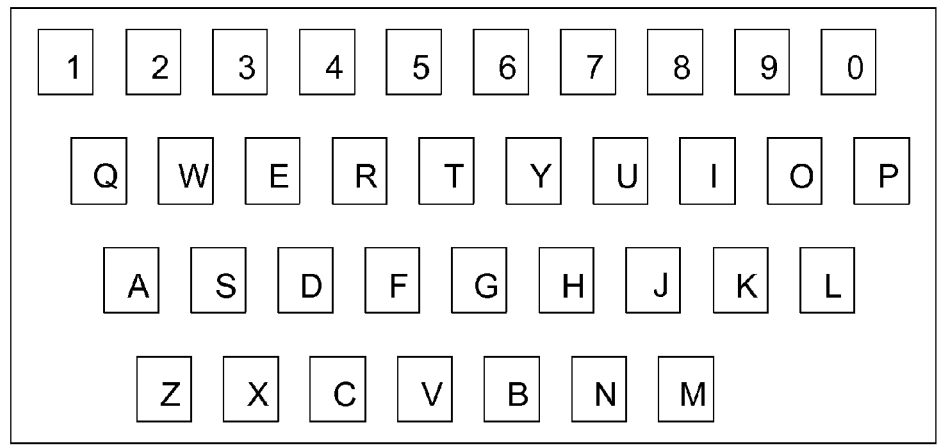
FIG. 4A is a block diagram illustrating an exemplary keyboard before being reconfigured according to an embodiment of the subject matter described herein.
Figure 4B:
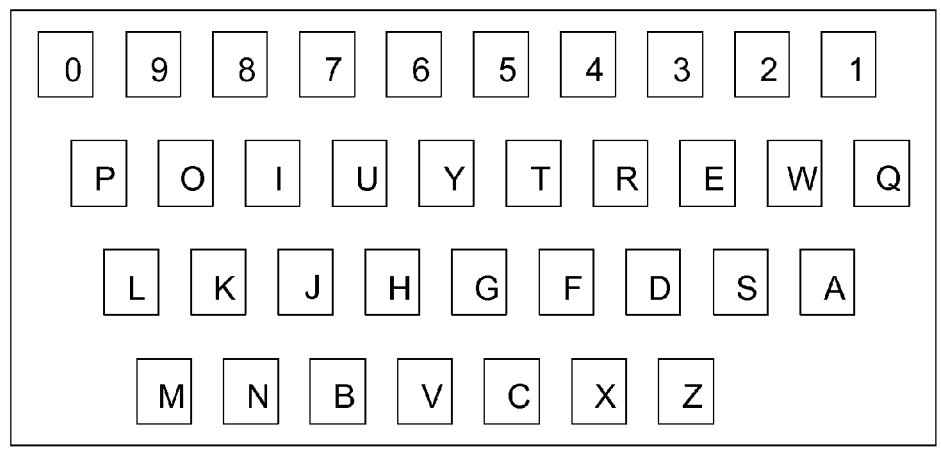
FIG. 4B is a block diagram illustrating an exemplary keyboard after being reconfigured according to an embodiment of the subject matter described herein.

FIGS. 4A and 4B illustrate an example of a keyboard 400 before reconfiguration and after reconfiguration, respectively, according to an embodiment of the subject matter described herein. In this example, keyboard 400 is a "QWERTY" keyboard. FIG. 4A shows the arrangement of the keys before reconfiguration and as the keys are actually labeled. For example, before reconfiguration, when the key labeled "Q" is depressed, the letter "Q" will be entered. FIG. 4B shows the keys of keyboard 400 after reconfiguration. The labeling of the keys after reconfiguration remains the same as before reconfiguration. The mapping of the keys changes after reconfiguration. In this example, when the key labeled "Q" is depressed after reconfiguration, the letter "P" will be entered.

In one embodiment, an operator may change the operational mode of input interface to a more secure mode. For example, the operator may determine that increased security is desired and increased the input interface security level for data being entered.

According to one aspect of the subject matter described herein, feedback may be provided to an operator when an input interface is in a reconfigured operational mode. Feedback may be audio, visual, smell, or tactile. Referring to FIG. 1, user interface 102 may include a feedback module 128 for providing feedback responses when input interface 104 is in a reconfigured operational mode. In one embodiment, feedback module 128 may be a speaker for playing a sound to indicate a reconfigured operational mode. The speaker may be a part of output interface 106. For example, a sound may be played for indicating when function 120 accepts actual data from input interface 104 and passes the data to application 108. Further, for example, the sound may be played when the operator is required to enter padded data. In one embodiment, a music file (e.g., an MP3 file) is played or paused to indicate entry into or exit from secure input mode.

In another embodiment, feedback module 128 may be a display for visually indicating when function 120 accepts actual data from input interface 104 and passes the data to application 108. The display may be a part of output interface 106. Further, for example, the visual indication may display an indicator that the input interface is in secure mode. A visual indication may be a change in the background screen color of a display or the display of an icon.

In one embodiment, feedback module 128 may emit a smell to indicate when the input interface is operating in secure or non-secure mode. The smell release device may be a part of input interface 104 or output interface 106. An example of smell feedback may be the release of a puff of perfume.

In another embodiment, feedback module 128 may provide the user with physical feedback to indicate that the input interface is operating in secure or non-secure mode. An example of physical feedback may be an increase or a decrease in the amount of force required to depress a keypad button. In an alternative example, physical feedback may be vibration of a device, such as a mobile telephone.

Table 3 below shows exemplary data destinations, environments, configuration instructions, and feedback.

TABLE 3

Exemplary Data Destinations, Environments, Configuration Instructions, and Feedback

| Data Destination | Environment | Configuration Instruction for Input Interface | Feedback |
|---|---|---|---|
| System password | Location: Work Host Device: work PC Human/Device proximity: Around Contractors Input modality: Keyboard | Switch to Japanese | Audio |
| Bank account login name | Location: Public Host Device: Any Human/Device proximity: Around people or cameras Input modality: Any | Map key to the next letter of the alphabet | Switch keys to heavy |
| Login into bank account | Location: Public Host Device: PDA Human/Device proximity: Around people or cameras Input modality: Stylus | Blank out keys | Keytones |

Based on the feedback, an operator may know the mode in which the input interface is operating. For example, if the keys have been switched to a heavy setting, the operator can know that each key has been mapped to the next letter of the alphabet.

Figure 5:
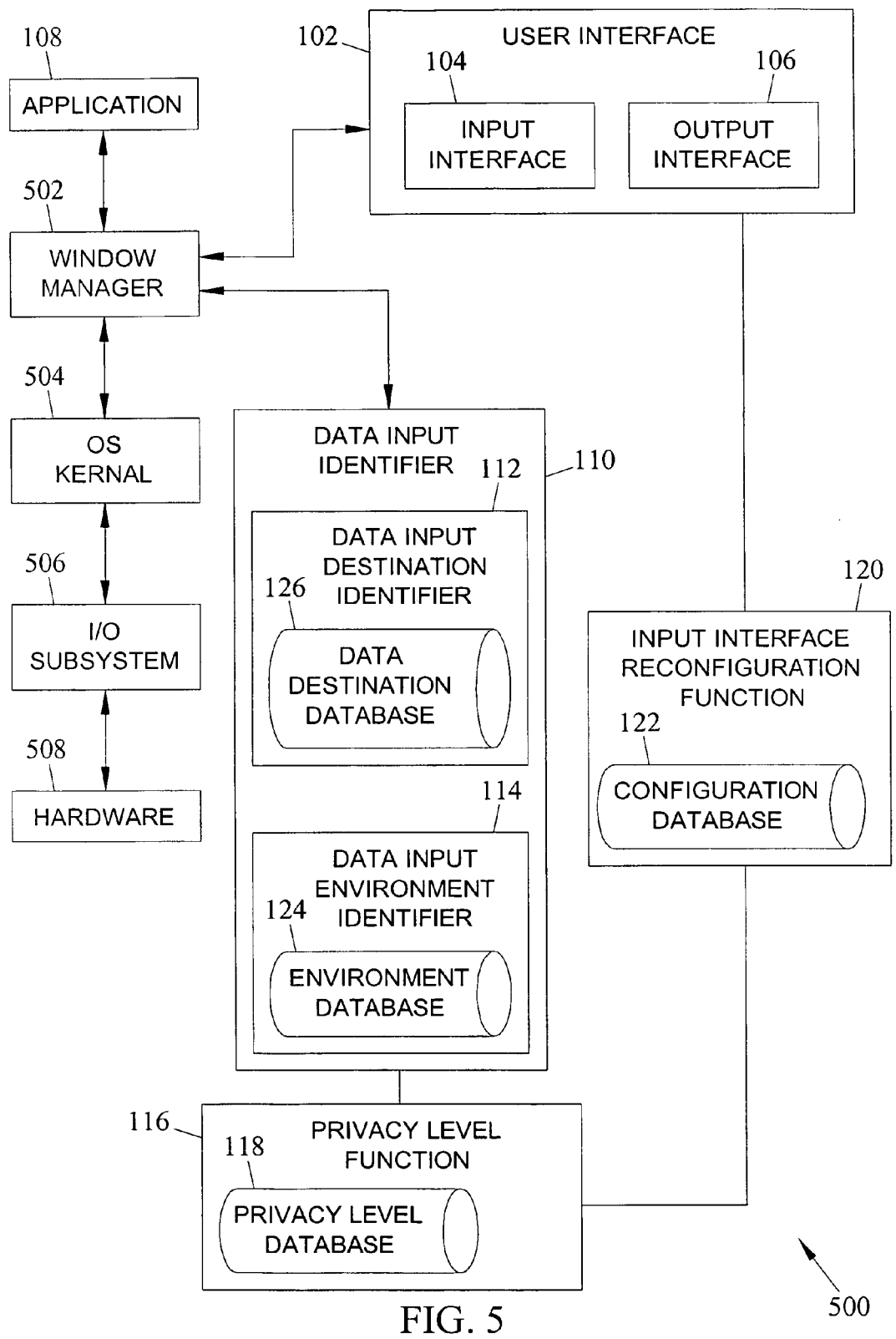
FIG. 5 is a block diagram of an operating system module of a computer system for reconfiguring an operational mode of an input interface based on a privacy level according to an embodiment of the subject matter described herein.

FIG. 5 illustrates an example of an operating system module 500 of a computer system for reconfiguring an operational mode of input interface 104 based on a privacy level according to an embodiment of the subject matter described herein. In this embodiment, application 108 is maintained on the computer system where input interface 102 is labeled. Referring to FIG. 5, the operating system includes a window manager 502, an operating system kernel 504, an I/O subsystem 506, and hardware 508. Application 108 may generate data entry field and display the field via output interface 106. Data input destination identifier 112 is associated with window manager 502 and is configured to detect a currently active data entry field and determine if there is an associated entry in data destination database 126 for determining a privacy level. Alternatively, data input destination identifier 112 may detect a currently active application 108, a URL in a web browser, or a specific file that is open. In any case, identifier 112 may identify the data destination for the data being entered. Privacy level function 116 may determine an input interface privacy level based on the identified data destination for the data being entered. Input interface reconfiguration function 120 may reconfigure input interface 104 to operate in a mode corresponding to the determined input interface privacy level. As a result, data entered via input interface 104 is provided increased security.

Figure 6:
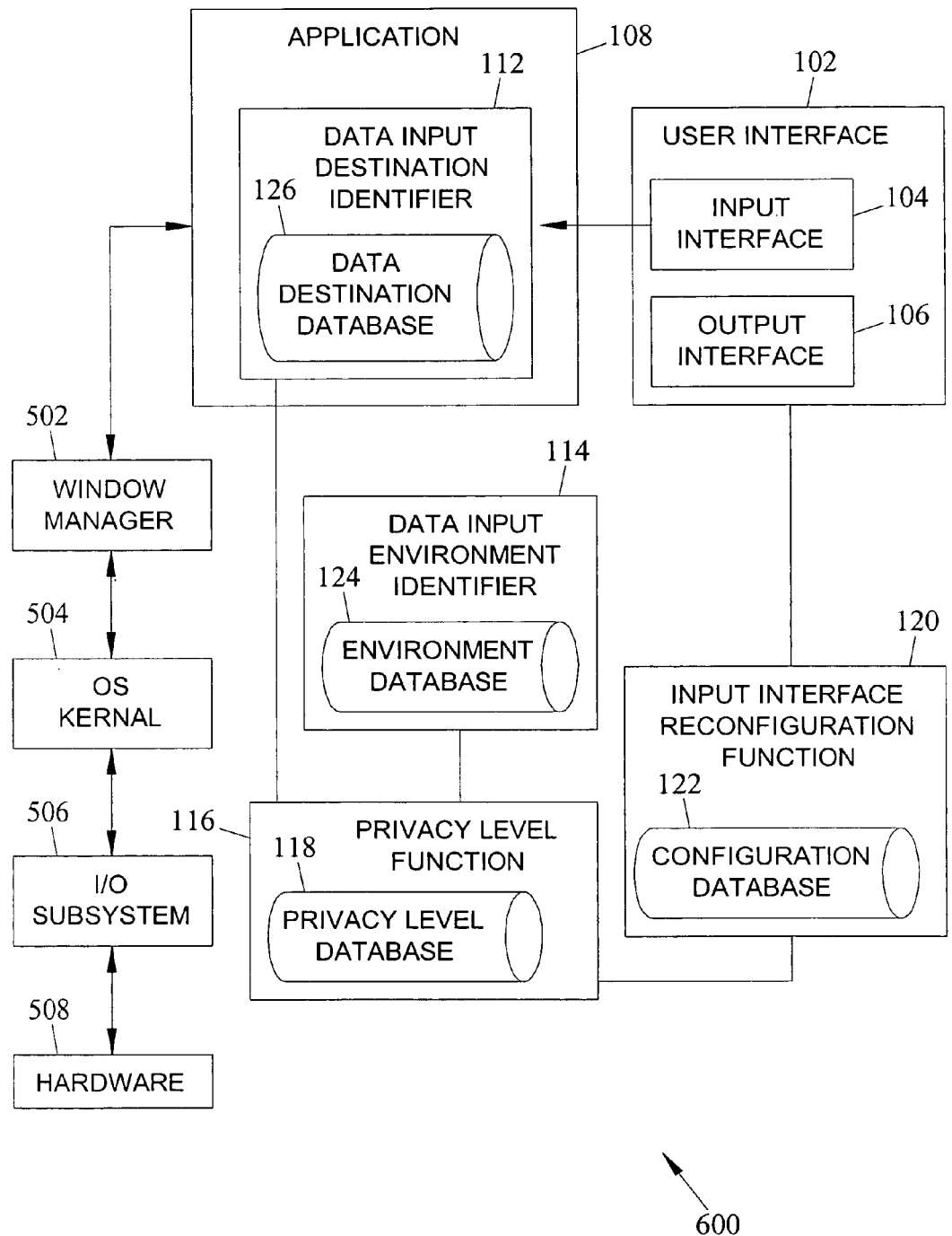
FIG. 6 is a block diagram illustrating an application module of a computer system for reconfiguring an operational mode of an input interface based on a privacy level according to an embodiment of the subject matter described herein.

FIG. 6 illustrates an example of an application module 600 of a computer system for reconfiguring an operational mode of input interface 104 based on a privacy level according to an embodiment of the subject matter described herein. In this embodiment, data input destination identifier 112 is implemented as a module or plug-in for application 108. Privacy level function 116 and input interface reconfiguration function 120 may also be implemented in the plug-in or may be separate from application 108. Referring to FIG. 6, the operating system includes a window manager 502, an operating system kernel 504, an I/O subsystem 506, and hardware 508. Application 108 may generate a data entry field and display the field via output interface 106. Data input destination identifier 112 may detect the displayed data entry field from within application 108 and thereby identify the data destination for the data being entered. Privacy level function 116 may determine an input interface privacy level based on the identified data destination for the data being entered. Input interface reconfiguration function 120 may reconfigure input interface 104 to operate in a mode corresponding to the determined input interface privacy level.

The following scenarios illustrate examples of reconfiguring an operational mode of an input interface based on a privacy level according to embodiments of the subject matter described herein:

Scenario A: Key Remapping
  i. Bob starts a new job at the U.S. Embassy in a foreign country.
  ii. On Bob's first day, he is given training on how to access the network.
  iii. During training, Bob learns that it is suspected that the embassy building has spy cameras and that double agents could be present as well.
  iv. Bob is told that it is imperative that Bob should not allow anyone to know what his account login and password are because his account has access to national security data.
  v. Bob is also told that the embassy uses a system for reconfiguring an operational mode of keyboard for the network based on a privacy level and that the system will help to keep network access information secure from persons trying to shoulder surf via cameras or by keystroke logging.
  vi. Bob learns how keyboard entries Bob that need to be made will change each time because the keyboard will be reconfigured based on his security environment. For example, the keyboard configuration at the embassy is different from the keyboard configuration that is on when he takes his laptop computer home. The applications that are used to work with top secret data will automatically employ keyboard reconfiguration while his webmail account will not.

Scenario B: Blank Keys
  i. Bob powers-up his PC and depresses the "Ctrl", "Alt", and "Delete" keys on a keyboard to login to the PC.
  ii. The PC includes a system for reconfiguring an operational mode of an input interface based on a privacy level. The system detects the user name and password fields on the display. Further, the system also detects the application that the user name and password belongs to.
  iii. The keyboard buttons deactivate their character display so that the buttons are blank.
  iv. Bob begins to enter his credentials and a sound is played with every depression of a key to let Bob know that the key press was correct. Bob is authenticated.
  v. After authentication, the keyboard buttons activate the characters so that they are again visible to Bob.
  vi. Bob then opens a browser to view his online bank account.
  vii. The system detects the fields indicating that Bob must enter a user name and password.
  viii. Again, the characters are deactivated while Bob types in the information.
  ix. Once Bob is authenticated, the characters of the keyboard are re-activated.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for reconfiguring an operational mode of an input interface of a device based on a privacy level, the method comprising:
    identifying, by the device, at least one of an environment in which data is being entered into a computer via the input interface or a destination for the data being entered;
    automatically determining, by the device, if a current input interface privacy level should be changed to another input interface privacy level based on the identified at least one of the environment or the data destination;
    automatically determining, by the device, the other input interface privacy level if the current input interface privacy level should be changed;
    automatically reconfiguring, by the device, the input interface to operate in a mode corresponding to the other input interface privacy level if the current input interface privacy level should be changed, each mode changing how data is entered into the device via the input interface; and
    keeping the input interface configured to operate in a mode corresponding to the current input interface privacy level if the current input interface privacy level should not be changed.

2. The method of claim 1, wherein identifying an environment in which data is being entered includes determining a location of where the data is being entered.

3. The method of claim 1, wherein identifying an environment in which data is being entered includes determining persons at a location of where the data is being entered.

4. The method of claim 1, wherein identifying an environment in which data is being entered includes identifying the device to which the input interface provides the entered data.

5. The method of claim 1, wherein identifying an environment in which data is being entered includes determining a type of the input interface into which data is being entered.

6. The method of claim 1, wherein identifying a destination for the data being entered includes determining a data field into which data is being entered.

7. The method of claim 1, wherein identifying a destination for the data being entered includes determining a URL associated with a data field into which data is being entered.

8. The method of claim 1, wherein identifying a destination for the data being entered includes determining an application into which data is being entered.

9. A method for reconfiguring an operational mode of an input interface based on a privacy level, the method comprising:
    identifying at least one of an environment in which data is being entered into a device via an input interface or a destination for the data being entered;
    determining if a current input interface privacy level should be changed to another input interface privacy level based on the identified at least one of the environment or the data destination, wherein determining if an input interface privacy level should be changed includes searching a database for an entry matching the at least one of the identified environment and the identified data destination;
    determining the other input interface privacy level if the current input interface privacy level should be changed;
    automatically reconfiguring the input interface to operate in a mode corresponding to the other input interface privacy level if the current input interface privacy level should be changed, each mode changing how data is entered into the device via the input interface; and keeping the input interface configured to operate in a mode corresponding to the current input interface privacy level if the current input interface privacy level should not be changed, wherein at least one of the preceding actions is performed on at least one electronic hardware component.

10. The method of claim 9 comprising:

determining whether the database includes an entry matching at least one of the identified environment or the identified data destination; and in response to determining that the database does not include an entry matching the at least one of the identified environment or the identified data destination, querying an operator for an input interface privacy level.

11. The method of claim 9 comprising:

receiving an input interface privacy level from an operator for the at least one of the identified environment or the identified data destination; and in response to receiving the input interface privacy level from the operator, adding an entry to the database associating the input interface privacy level with the at least one of the identified environment or the identified data destination.

12. The method of claim 1, wherein determining the other input interface privacy level includes selecting the other input interface privacy level from a plurality of different input interface privacy levels.

13. A method for reconfiguring an operational mode of an input interface based on a privacy level, the method comprising:

identifying at least one of an environment in which data is being entered into a device via an input interface or a destination for the data being entered;

determining if a current input interface privacy level should be changed to another input interface privacy level based on the identified at least one of the environment or the data destination;

determining the other input privacy level if the current input interface privacy level should be changed, wherein determining the other input interface privacy level includes calculating the input interface privacy level based on a value assigned to the at least one of the environment or the data destination;

automatically reconfiguring the input interface to operate in a mode corresponding to the other input interface privacy level if the current input interface privacy level should be changed, each mode changing how data is entered into the device via the input interface; and keeping the input interface configured to operate in a mode corresponding to the current input interface privacy level if the current input interface privacy level should not be changed, wherein at least one of the preceding actions is performed on at least one electronic hardware component.

14. The method of claim 13 wherein the calculated input interface privacy level is proportional to weights assigned to the at least one of the identified environment or the identified data destination.

15. A method for reconfiguring an operational mode of an input interface based on a privacy level, the method comprising:

identifying at least one of an environment in which data is being entered into a device via an input interface or a destination for the data being entered;

determining if a current input interface privacy level should be changed to another input interface privacy level based on the identified at least one of the environment or the data destination;

determining the other input privacy level if the current input interface privacy level should be changed;

automatically reconfiguring the input interface to operate in a mode corresponding to the other input interface privacy level if the current input interface privacy level should be changed, each mode changing how data is entered into the device via the input interface; and keeping the input interface configured to operate in a mode corresponding to the current input interface privacy level if the current input interface privacy level should not be changed, wherein at least one of the preceding actions is performed on at least one electronic hardware component, and wherein the input interface comprises a keyboard or keypad including a plurality of keys or a touch screen display operable to display a plurality of keys, and wherein automatically reconfiguring the input interface includes automatically reconfiguring the keys of the keyboard or keypad or the keys displayed by the touch screen display such that the labeling of the keys is different than the data being entered via the keyboard or keypad or the touch screen display.

16. The method of claim 1, further comprising indicating when the input interface is reconfigured to operate in the mode corresponding to the other input interface privacy level.

17. A system, in a device, for reconfiguring an operational mode of an input interface of the device based on a privacy level, the system comprising:

a data input identifier of the device configured to enable the device identify at least one of an environment in which data is being entered into the device via an input interface or a destination for the data being entered;

a privacy level function module of the device configured to enable the device to determine if a current input interface privacy level should be changed to another input interface privacy level based on the identified at least one of the environment or the data destination and to determine the other input interface privacy level if the current input interface privacy level should be changed; and an input interface reconfiguration function module of the device configured to enable the device to automatically reconfigure the input interface to operate in a mode corresponding to the other input privacy level if the current input interface privacy level should be changed and to keep the input interface configured to operate in a mode corresponding to the current input interface privacy level if the current input interface privacy level should not be changed, each mode corresponding to a respective way in which data is entered into the device via the input interface.

18. The system of claim 17, wherein the input interface is an interface selected from the group consisting of a keyboard, keypad, and touch screen display.

19. The system of claim 17, wherein the data input identifier is operable to determine a location of where the data is being entered.

20. The system of claim 17, wherein the data input identifier is operable to identify persons at a location of where the data is being entered.

21. The system of claim 17, wherein the data input identifier is operable to identify a device to which the input interface provides the entered data.

22. The system of claim 17, wherein the data input identifier is operable to determine a type of the input interface into which data is being entered.

23. The system of claim 17, wherein the data input identifier is operable to determine a data field into which data is being entered.

24. The system of claim 17, wherein the data input identifier module is operable to determine a URL associated with a data field into which data is being entered.

25. The system of claim 17, wherein the data input identifier module is operable to determine an application into which data is being entered.

26. A system for reconfiguring an operational mode of an input interface based on a privacy level, the system comprising system components including:
   a data input identifier configured to identify at least one of an environment in which data is being entered into a computer via an input interface or a destination for the data being entered;
   a privacy level function configured to determine if a current input interface privacy level should be changed to another input interface privacy level based on the identified at least one of the environment or the data destination and to determine the other input interface privacy level if the current input interface privacy level should be changed, wherein the privacy level function is further operable to search a database for an entry matching the identified environment and/or the identified data destination; and
   an input interface reconfiguration function configured to automatically reconfigure the input interface to operate in a mode corresponding to the other input privacy level if the current input interface privacy level should be changed and to keep the input interface configured to operate in a mode corresponding to the current input interface privacy level if the current input interface privacy level should not be changed, each mode corresponding to how data is entered into the device via the input interface, wherein at least one of the system components includes at least one electronic hardware component.

27. The system of claim 26 wherein the data input identifier is operable to:
   determine whether the database includes an entry matching the at least one of the identified environment or the identified data destination; and
   in response to determining that the database does not include a matching entry, query an operator for an input interface privacy level.

28. The system of claim 27 wherein the data input identifier is operable to:
   receive the input interface privacy level from the operator; and
   in response to receiving the input interface privacy level from the operator, add a corresponding entry to the database.

29. The system of claim 17, wherein the privacy level function module is operable to select the other input interface privacy level from a plurality of different input interface privacy levels.

30. A system for reconfiguring an operational mode of an input interface based on a privacy level, the system comprising system components including:
   a data input identifier configured to identify at least one of an environment in which data is being entered into a computer via an input interface or a destination for the data being entered;
   a privacy level function configured to determine if a current input interface privacy level should be changed to another input interface privacy level based on the identified at least one of the environment or the data destination and to determine the other input interface privacy level if the current input interface privacy level should be changed, wherein the privacy level function is further operable to calculate the other input interface privacy level based on a value assigned to the at least one of the identified environment or the identified data destination; and
   an input interface reconfiguration function configured to automatically reconfigure the input interface to operate in a mode corresponding to the other input privacy level if the current input interface privacy level should be changed and to keep the input interface configured to operate in a mode corresponding to the current input interface privacy level if the current input interface privacy level should not be changed, each mode corresponding to how data is entered into the device via the input interface, wherein at least one of the system components includes at least one electronic hardware component.

31. The system of claim 30 wherein the privacy level function is adapted to calculate the other input interface privacy level from weights assigned to the at least one of the identified environment or the identified data destination.

32. A system for reconfiguring an operational mode of an input interface based on a privacy level, the system comprising system components including:
   a data input identifier configured to identify at least one of an environment in which data is being entered into a computer via an input interface or a destination for the data being entered;
   a privacy level function configured to determine if a current input interface privacy level should be changed to another input interface privacy level based on the identified at least one of the environment or the data destination and to determine the other input interface privacy level if the current input interface privacy level should be changed; and
   an input interface reconfiguration function configured to automatically reconfigure the input interface to operate in a mode corresponding to the other input privacy level if the current input interface privacy level should be changed and to keep the input interface configured to operate in a mode corresponding to the current input interface privacy level if the current input interface privacy level should not be changed, each mode corresponding to how data is entered into the device via the input interface, wherein at least one of the system components includes at least one electronic hardware component, wherein the input interface comprises a keyboard or keypad including a plurality of keys or a touch screen display operable to display a plurality of keys, and wherein the input interface reconfiguration function is further operable to reconfigure the keys of the keyboard or keypad or the keys displayed by the touch screen display such that the labeling of the keys is different than the data being entered via the keyboard or keypad or the touch screen display.

33. The system of claim 17, further comprising a feedback module operable to indicate when the input interface is reconfigured to operate in the mode corresponding to the other input interface privacy level.

34. A system, in a device, for reconfiguring an operational mode of an input interface of the device based on a privacy level, the system comprising:
- means for identifying, by the device, at least one of an environment in which data is being entered into the device via an input interface or a destination for the data being entered;
- means for determining, by the device, if a current input interface privacy level should be changed to another input interface privacy level based on the identified at least one of the environment or the data destination;
- means for determining, by the device, the other input interface privacy level if the current input interface privacy level should be changed; and
- means for automatically reconfiguring, by the device, the input interface to operate in a mode corresponding to the other input interface privacy level if the current input interface privacy level should be changed and for keeping the input interface configured to operate in a mode corresponding to the current input interface privacy level if the current input interface privacy level should not be changed, each mode corresponding to a way in which data is entered into the device via the input interface,
- wherein at least one of the means includes at least one electronic hardware component.

* * * * *

UNITED STATES PATENT AND TRADEMARK OFFICE
CERTIFICATE OF CORRECTION

PATENT NO. : 8,230,481 B2  
APPLICATION NO. : 11/286718  
DATED : July 24, 2012  
INVENTOR(S) : Singh et al.

Page 1 of 1

It is certified that error appears in the above-identified patent and that said Letters Patent is hereby corrected as shown below:

In Fig. 2, Sheet 2 of 6, for Tag "202", in Line 4, delete "ONE THE" and insert -- ONE OF THE --, therefor.

Signed and Sealed this  
First Day of January, 2013

David J. Kappos  
*Director of the United States Patent and Trademark Office*